Figure 1:
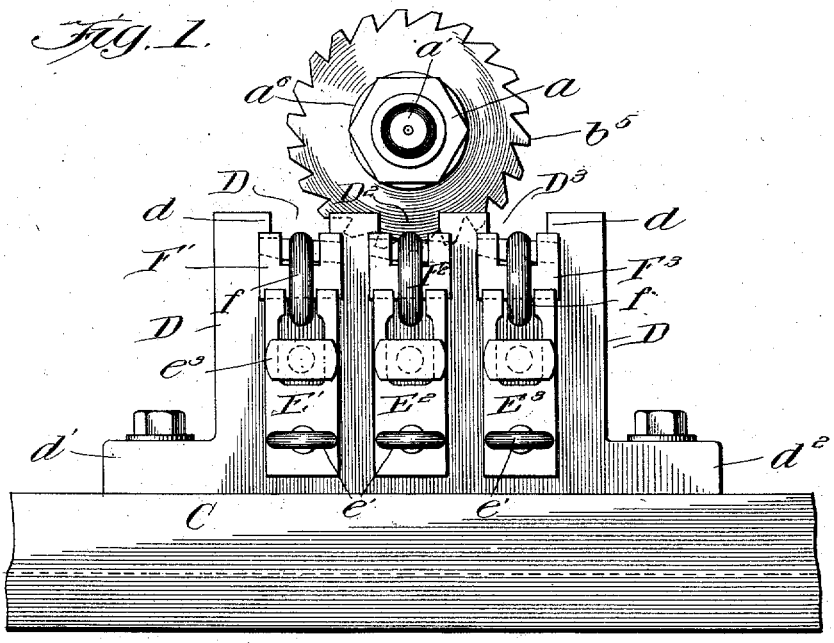

No. 12,593. REISSUED JAN. 8, 1907.

H. H. VAUGHAN.

HOLDER FOR MILLING MACHINES.

APPLICATION FILED JULY 12, 1906.

2 SHEETS—SHEET 1.

Witnesses:

H. S. Gaither

Ruby Rash

Inventor:

Henry H. Vaughan by Chamberlin & Pilkinson his attorneys

THE NORRIS PETERS CO., WASHINGTON, D. C.

No. 12,593. REISSUED JAN. 8, 1907.

H. H. VAUGHAN.

HOLDER FOR MILLING MACHINES.

APPLICATION FILED JULY 12, 1906.

2 SHEETS—SHEET 2.

Witnesses:

W. S. Gaither

Ruby V. Nash.

Inventor:

Henry H. Vaughan by Lamberlint Mckinson his attorneys

THE NORRIS PETERS CO., WASHINGTON, D. C.

UNITED STATES PATENT OFFICE.

HENRY H. VAUGHAN, OF MONTREAL, QUEBEC, CANADA, ASSIGNOR TO THE RAILROAD SUPPLY COMPANY, OF CHICAGO, ILLINOIS, A CORPORATION OF ILLINOIS.

HOLDER FOR MILLING-MACHINES.

No. 12,593. Specification of Reissued Letters Patent. Reissued Jan. 8, 1907.

Original No. 819,961, dated May 8, 1906. Application for reissue filed July 12, 1906. Serial No. 325,973.

*To all whom it may concern:*

Be it known that I, HENRY H. VAUGHAN, a citizen of the United States, residing at Montreal, Province of Quebec, Dominion of Canada, have invented a certain new and useful Improvement in Holders for Milling-Machines; and I declare the following to be a full, clear, and exact description of the invention, such as will enable others skilled in the art to which it pertains to make and use the same, reference being had to the accompanying drawings, which form a part of this specification.

My invention relates generally to milling-machines, and more particularly to mechanism for supporting the articles in position to be engaged by the cutters.

In the use of milling-machines for operating upon articles of a size less than the range of movement of the supporting-table relatively to the cutters—as, for instance, in the manufacture of channel-pins for uniting electrical conductors—it is desirable to support upon the table a plurality of rows of alined articles, the number in each row corresponding to the number of cutters in the gang and the number of rows being determined by the extent of relative movement possible between the table and the gang of cutters.

The object of my invention is to provide a milling-machine comprising a gang of cutters and a relatively movable table upon which the articles to be cut are supported, with holding mechanism for receiving a number of articles and retaining a plurality thereof in alinement with each cutter of the gang, so that as the supporting-table and cutters are relatively moved each cutter will engage in succession a plurality of articles, each reciprocation of the table relative to the cutters being thereby utilized to cut several articles, and consequently avoid the necessity of returning the table to its initial position after a single article has passed the corresponding cutter.

A further object of my invention is to provide the supporting-table of a milling-machine with means for removably holding one or more magazines, each of which is adapted to contain a plurality of articles to be engaged by the cutters.

A still further object of my invention is to provide work-holding mechanism of the character described for milling-machines, which will be simple in construction, inexpensive in manufacture, and efficient in operation.

My invention generally described consists in a holder adapted to be secured to the table of a milling-machine and having means for removably retaining one or more magazines, each of which contains a plurality of articles spaced apart distances corresponding to the spaces between the cutters of the gang.

My invention will be more fully described hereinafter with reference to the accompanying drawings, in which the same is illustrated as embodied in a convenient and practical form, and in which—

Figure 2:
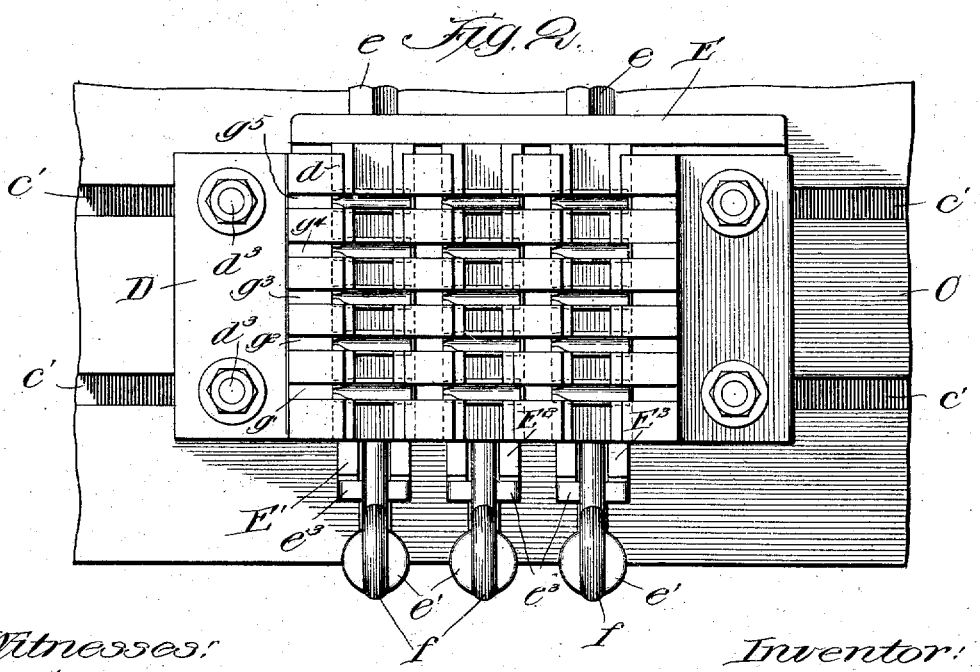
Figure 3:
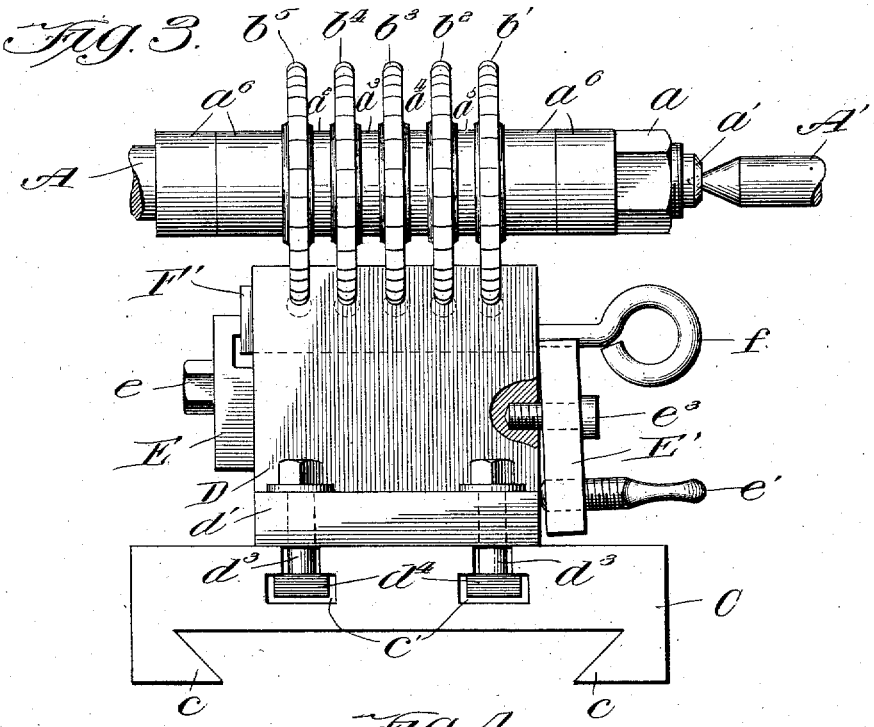
Figure 4:
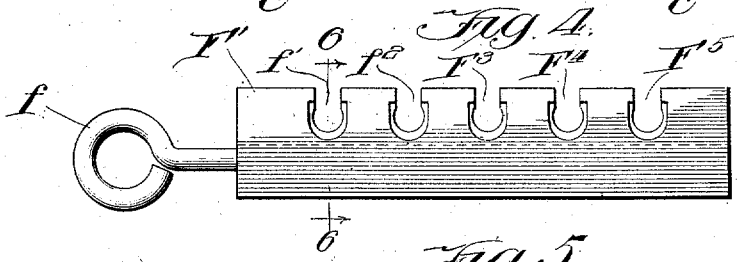
Figure 5:
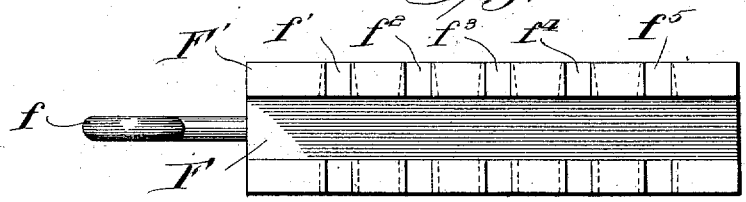
Figure 6:
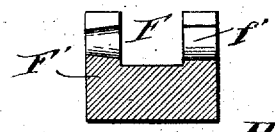

Figure 1 is a side elevational view of my improved holder and so much of a milling-cutter as it is necessary to show its connection therewith; Fig. 2, a plan view of my improved holder and a portion of the table of a milling-cutter; Fig. 3, an elevational view looking from the left in Fig. 1; Fig. 4, an elevational view of one of the magazines; Fig. 5, a plan view of one of the magazines; and Fig. 6, a cross-sectional view on line 6 6, Fig. 4.

Similar reference characters are used in the several figures of the drawings to designate similar parts.

Reference-letter A indicates a shaft upon which are fixed one or more cutting-disks $b'$, $b^2$, $b^3$, $b^4$, and $b^5$. The cutting-disks are spaced apart by means of collars $a^2$, $a^3$, $a^4$, and $a^5$. The shaft A is journaled upon suitable bearings, one of which is indicated at A′ at the right of Fig. 3. The bearing A′ is shown as having a pointed end fitting within the recess formed in the reduced end $a'$ of the shaft. The cutters are spaced at the desired distance from the opposite ends of the shaft A by means of collars $a^6$ $a^6$, interposed between the outside cutters of the series, and nuts $a$, screwed upon the ends of the shaft. The shaft A may be rotated in any preferred manner well known in the art of milling-cutters.

A table C is supported upon the base of the machine and moved relatively to the cutters in any well-known manner. The table C may conveniently be provided with inwardly-projecting flanges $c$ $c$, forming a dovetail channel to guide the table upon the supporting-base. The table C is provided with parallel grooves $c'$, preferably extending at right angles to the cutter-supporting shaft A.

A holder D is secured to the table C by any suitable means—as, for instance, by bolts $d^3$, the heads $d^4$ of which are located in the grooves $c'$, as clearly shown in Fig. 3. The bolts $d^3$ extend upwardly through openings in flanges $d'$ and $d^2$, projecting from the opposite ends of the holder D. Nuts are secured upon the ends of the bolts, which extend above the flanges $d'$ and $d^2$, and, if desired, washers may be interposed between the upper surfaces of the flanges and the nuts. The holder D is provided with a plurality of channels D′, $D^2$, and $D^3$, extending parallel to the cutter-supporting shaft A. The channels are provided with overhanging flanges $d$ to retain within the channels the magazines, subsequently to be described. The upper surface of the holder D is provided with a series of parallel grooves $g'$, $g^2$, $g^3$, $g^4$, and $g^5$, located in alinement with the several cutters $b'$, &c. Each of the channels D′, $D^2$, and $D^3$ is adapted to receive a magazine F′ $F^2$ $F^3$. Each of the magazines is provided with a central channel F. The flanges formed at either side of the channel F are provided with a series of sockets to receive the articles which are to be operated upon by the cutters. In the present instance the recesses $f'$, $f^2$, $f^3$, $f^4$, and $f^5$ are so shaped as to receive U-shaped channel-pins which have been previously formed with the desired exterior contour and which are to be engaged by the cutters, and thereby given the desired interior cross-section.

By reference to the drawings, particularly Figs. 4 and 5, it will be seen that the recesses or sockets in the flanges of the magazines are provided with inwardly-projecting edges to overlie the channel-pins in order to securely retain them in position to be engaged by the cutters. It will also be observed that the recesses are tapered to conform to the outer surfaces of the channel-pins, which are inserted therein preparatory to being milled.

In Fig. 2 the magazines F′ and $F^2$ contain channel-pins which have not been engaged by the cutters, while magazine $F^3$ contains channel-pins which have been operated upon by the cutters. The magazines may be conveniently provided with means, such as the eyes $f$, for inserting the same in and removing from the channels D′, $D^2$, and $D^3$, formed in the holder D.

In order that the magazines may be so located in the channels in the holder that the grooves $f'$, &c., may register with the grooves $g'$, &c., a stop is secured to the side of the holder opposite to that in which the magazines are inserted. This stop is shown as consisting in a cleat E, fastened to the holder by means of screws $e$. The cleat is provided with a flange which projects above the channels D′, $D^2$, and $D^3$ and is engaged by the ends of the magazines when they are inserted in the channels. The magazines are retained in engagement with the cleat E by latches E′, $E^2$, and $E^3$. These latches are shown as provided with openings near their upper ends which surround screws $e^3$, the heads of the latter extending across the openings in the latches, as clearly shown in Fig. 1. Near the lower end of each latch is a set-screw $e'$, which engages the adjacent surface of the holder D.

The number of channels to receive the magazines may be varied, the number only being limited by the extent of the relative movement between the table and the gang of cutters. The number of cutting-disks in the gang may also be varied, the maximum number being limited by the length of the shaft and by the width of the movable table. The grooves $g'$, &c., in the upper surface of the holder and the sockets $f'$, &c., in the magazines should of course correspond with the number of cutters and must obviously be spaced apart distances corresponding to the spaces between the cutters.

The operation of my improvement, which will be readily understood from the foregoing description, is as follows: The magazines before insertion in the holder are filled with channel-pins—that is, a channel-pin is located in each of the sockets $f'$, $f^2$, $f^3$, $f^4$, and $f^5$, formed through the flanges at either side of the central passage F. The several latches E′, $E^2$, and $E^3$ are slid downwardly so as to permit the magazines to be inserted in the grooves D′, $D^2$, and $D^3$. The magazines are prevented from vertical displacement by the overhanging flanges $d$. After the magazines have been inserted in the holder the latches E′, &c., are forced upwardly around the screws $e^3$, so that the upper end of the latches engage the ends of the magazines. The set-screws $e'$ are then turned so as to engage the surface of the holder, and thereby rock the latches about the heads of the screws $e^3$ as fulcrums and force the magazines into contact with the cleat E. The relative location of the sockets in the magazines and the grooves $g'$, &c., in the holder is such that when the magazines are properly secured within the channels in the holder the channel-pins will register with the grooves $g'$, &c. The table C is then moved relatively to the rotating cutters, so that the channel-pins in the several magazines are successively engaged by the corresponding cutting-disks. After the table has completed its movement relatively to the gang of cutters it is returned to the starting-point, where the magazines may be removed from the holder by unscrewing the set-screws $e'$ and permitting the latches E′, &c., to drop below the path of movement of the magazines out of the respective channels in the holder. Other magazines, the sockets in which have been filled with channel-pins, then inserted in the holder and locked in place by means of the latches. The reciprocation of the table C is then repeated and the channel-pins operated upon by the gang of cutters.

From the foregoing description it will be observed that my improvement enables a number of articles to be successively engaged by each cutter of a gang, thereby utilizing a single reciprocation of the table relatively to the gang of cutters to cut a number of articles.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention, what I claim as new, and desire to secure by Letters Patent, is—

1. The combination with a multiple work-holder for milling-machines having a channel therein extending transversely to the direction of its movement and also having a plurality of parallel grooves formed in the upper surface thereof, and extending in the direction of movement of the holder, a magazine engaging said channel and adapted to support articles in register with said grooves.

2. The combination with a multiple work-holder having a channel extending transversely to its path of movement, of a magazine for removably engaging said channel, means for supporting a plurality of articles upon said magazine, a stop carried by said holder at one end of said channel, and an adjustable latch carried by said holder at the opposite end of the channel adapted to engage said magazine and retain the same in contact with said stop.

3. The combination with a movable multiple work-holder having a plurality of channels therein extending transversely to its direction of movement, a plurality of magazines engaging said channels and each adapted to support a plurality of articles, a stop carried by said holder at one side thereof and projecting into alinement with said channels, and an adjustable latch carried by said holder at the end of each channel opposite to said stop, said latch being adapted to engage and retain the corresponding magazine in contact with said stop.

4. The combination with a multiple work-holder for milling-machines, of a magazine extending transversely across said holder and having a plurality of parallel grooves therein extending longitudinally with respect to said holder, said grooves adapted to hold articles therein, and means for removably supporting said magazine upon said holder.

5. The combination with a multiple work-holder for milling-machines, of a plurality of magazines extending transversely across said holder and each having a plurality of grooves therein extending longitudinally with respect to said holder, each of said grooves adapted to hold an article, and means for removably supporting said magazines upon said holder.

6. In a milling-machine for making channel-pins, the combination with a movable multiple work-holder of a magazine extending transversely to the path of movement of said holder and having a plurality of grooves therein extending parallel with the path of movement of said holder, each groove adapted to hold a channel-pin, and means for removably supporting said magazine upon said holder.

7. In a milling-machine for manufacturing channel-pins, the combination with a multiple work-holder of a magazine extending transversely to the path of movement of said holder and having a plurality of grooves therein extending parallel with the path of movement of said holder, each groove having inwardly-projecting edges to retain the channel-pin therein.

8. In a milling-machine for manufacturing channel-pins the combination with a multiple work-holder, of a magazine extending transversely to the path of movement of said holder and having a plurality of tapered grooves therein extending parallel with the path of movement of said holder.

9. In a milling-machine for manufacturing channel-pins, the combination with a multiple work-holder, of a magazine extending transversely to the path of movement of said holder and having a plurality of tapered grooves therein extending parallel with the path of movement of said holder, each groove having inwardly-projecting edges to retain a channel-pin therein.

HENRY H. VAUGHAN.

Witnesses:
E. M. HEAPP,
ALLAN A. MAGEE.